United States Patent [19]

Garms et al.

[11] Patent Number: 4,848,283
[45] Date of Patent: Jul. 18, 1989

[54] MARINE ENGINE WITH COMBINATION VAPOR RETURN, CRANKCASE PRESSURE, AND COOLED FUEL LINE CONDUIT

[75] Inventors: John F. Garms, Menaska; Norman H. Radtke, Fond du Lac, both of Wis.

[73] Assignee: Brunswick Corporation, Skokie, Ill.

[21] Appl. No.: 182,180

[22] Filed: Apr. 15, 1988

[51] Int. Cl.$^4$ .................. F02M 31/20; F02B 33/04
[52] U.S. Cl. .................. 123/73 AD; 123/541; 123/DIG. 5
[58] Field of Search .............. 123/541, 73 A, 73 AD, 123/DIG. 5

[56] References Cited

U.S. PATENT DOCUMENTS

| | | |
|---|---|---|
| Re. 26,400 | 6/1968 | Jasper . |
| 2,466,440 | 4/1949 | Kiekhaefer . |
| 2,656,828 | 10/1953 | Conover .................. 123/DIG. 5 |
| 2,791,186 | 5/1957 | Alden . |
| 2,935,057 | 5/1960 | Perlewitz .................. 123/DIG. 5 |
| 2,952,252 | 9/1960 | Geatty .................. 123/DIG. 5 |
| 3,541,786 | 11/1970 | Sarra . |
| 3,835,822 | 9/1974 | Mickle et al. . |
| 3,859,951 | 1/1975 | Woodfill . |
| 3,886,914 | 6/1975 | Ahrns et al. .................. 123/73 AD |
| 3,924,975 | 12/1975 | Hundertmark . |
| 3,983,857 | 10/1976 | O'Connor .................. 123/DIG. 5 |
| 3,987,775 | 10/1976 | O'Connor .................. 123/DIG. 5 |
| 4,059,086 | 11/1977 | Tsubouchi .................. 123/73 AD |
| 4,220,121 | 9/1980 | Maggiorana . |
| 4,294,470 | 10/1981 | Tucker . |
| 4,301,781 | 11/1981 | Lindberg .................. 123/541 |
| 4,306,614 | 12/1981 | Maggiorana . |
| 4,312,304 | 1/1982 | Tyner . |
| 4,372,011 | 2/1983 | Aranyos . |
| 4,392,779 | 7/1983 | Bloemers et al. . |
| 4,480,605 | 11/1984 | Bloemers . |
| 4,491,117 | 1/1985 | Koide .................. 123/541 |
| 4,504,238 | 3/1985 | Neisen . |
| 4,514,106 | 4/1985 | Slager . |
| 4,539,949 | 9/1985 | Walsworth .................. 123/DIG. 5 |
| 4,573,318 | 3/1986 | Entringer et al. . |
| 4,583,500 | 4/1986 | Hundertmark . |
| 4,728,306 | 3/1988 | Schneider . |
| 4,768,492 | 9/1988 | Widmer et al. .................. 123/541 |

FOREIGN PATENT DOCUMENTS 0106123  6/1983  Japan .

Primary Examiner—Willis R. Wolfe
Assistant Examiner—M. Macy
Attorney, Agent, or Firm—Andrus, Sceales, Starke & Sawall

[57] ABSTRACT

A marine propulsion system includes a two cycle water cooled crankcase compression internal combustion engine (52) including a vapor separator (33), a remote fuel tank (60), and a fuel pump (62) in the tank for delivering fuel to the engine in response to crankcase pulse pressure. A combination conduit (64) between the fuel tank and the engine includes a first passage (66) communicating crankcase pulse pressure from the engine to the fuel pump in the tank, a second passage (70) supplying fuel from the pump in the tank to the engine, a third passage (74) returing fuel vapor from the vapor separator at the engine back to the tank, a fourth passage (78) supplying cooling water from the engine towards the tank, and a fifth passage (82) returning water from the fourth passage back to the engine.

5 Claims, 2 Drawing Sheets

MARINE ENGINE WITH COMBINATION VAPOR RETURN, CRANKCASE PRESSURE, AND COOLED FUEL LINE CONDUIT

BACKGROUND AND SUMMARY

The invention relates to marine propulsion systems with two cycle water cooled internal combustion engines, and more particularly to the fuel supply system therefor. The invention relates to that of commonly owned co-pending Application Ser. No. 07/182,485, filed on Apr. 15, 1988, entitled "MARINE ENGINE WITH WATER COOLED FUEL LINE FROM REMOTE TANK", still pending, to which cross-reference is made.

In marine applications, hot fuel handling is a problem in high ambient temperature conditions, including the problem of vapor lock. Poor octane fuels further such problem.

The present invention provides a combination system which returns fuel vapor from the engine to a remote tank, delivers crankcase pulse pressure from the engine to a fuel pump at the remote tank which pumps fuel back to the engine, and cools the fuel as it flows from the remote tank to the engine. A combination conduit provides the various passages for such functions.

DESCRIPTION OF PRIOR ART

Figure 1:
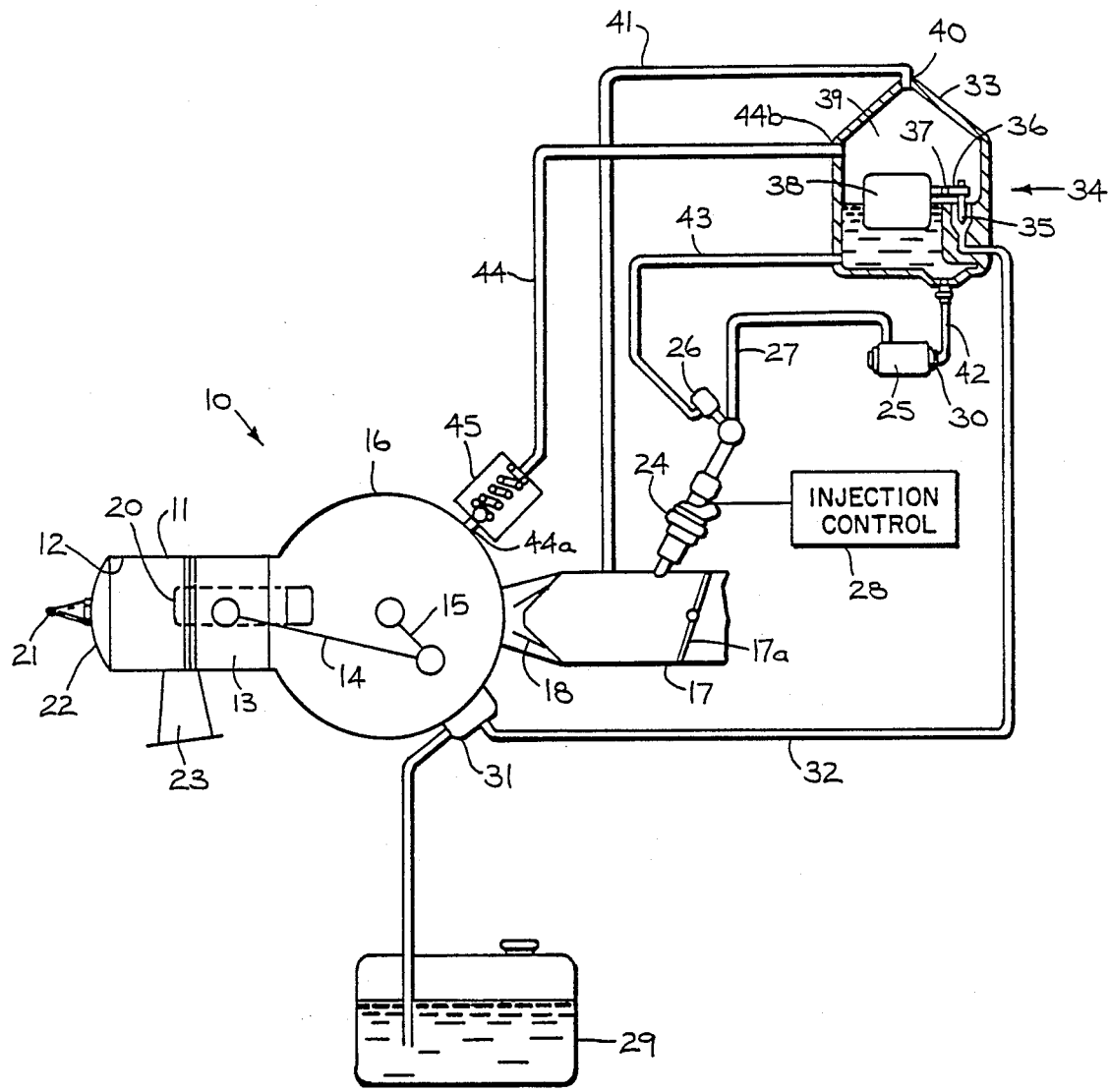
FIG. 1 shows a vapor separator system known in the prior art.

FIG. 1 shows one cylinder of a two cycle crankcase compression internal combustion engine 10. The engine includes a cylinder block 11 having a cylinder bore 12 in which a piston 13 is supported for reciprocation. The piston 13 is connected by connecting rod 14 to crankshaft 15 which is journaled for rotation in crankcase 16 of engine 10. The engine includes an induction system with air intake manifold 17 having throttle valve 17a and supplying combustion air to crankcase 16. One-way reed check valve 18 permits flow from manifold 17 into crankcase 16, and prevents reverse flow out of crankcase 16 into manifold 17. A transfer passage 19 extends from crankcase 16 through cylinder block 11 and terminates at inlet port 20 in the cylinder wall at a point above the bottom dead center position of piston 13. A spark plug 21 is provided in the cylinder head 22 for firing the fuel-air charge. An exhaust port 23 is formed in cylinder bore 12 to discharge exhaust gases to the atmosphere.

Engine 10 is provided with a fuel injection system that includes an electromagnetically controlled injection nozzle 24 that discharges into induction manifold 17. Fuel, typically gasoline, is supplied to nozzle 24 by a high pressure fuel pump 25. A presure regulator 26 is provided on the fuel supply line 27 to maintain an essentially constant fuel pressure at fuel injection nozzle 24. An electronic control 28 is provided to control the operation of injection nozzle 24 in known manner to deliver the desired amount of fuel to induction manifold 17 at the desired times.

During running of the engine, air is delivered to induction manifold 17 and fuel is injected by nozzle 24 to provide a fuel-air mixture which is admitted to crankcase 16 through reed valve 18 while piston 13 is moving upwardly toward spark plug 21. Reed valve 18 will open during these conditions as long as the pressure in crankcase 16 is lower than that in induction manifold 17. As piston 13 moves downwardly toward crankcase 16, exhaust port 23 will open to discharge spent combustion products, and intake port 20 will open to allow transfer of fuel-air mixture from crankcase 16 to cylinder 12. On the upstroke of piston 13, spark plug 21 is fired to ignite the mixture, and the cycle continues in conventional manner.

A vapor free supply of fuel from a remote fuel tank 29 is provided to the inlet 30 of high pressure fuel pump 25. A low pressure fuel pump 31, such as a diaphragm pump operated by the pulsating pressure in the engine's crankcase 16, is used to draw fuel from fuel tank 29. Such diaphragm pumps are commonly used on outboard motors and produce a fuel output closely matched to engine requirements. From the lower pressure pump 31 fuel is supplied by a fuel line 32 to a vapor separator 31. Admission of fuel from low pressure pump 31 to vapor separator 33 is controlled by a float operated valve 34. The valve member 35 is controlled by a lever 36 having a pivot point 37 fixed on the vapor separator 33 and attached to a float 38. The level of fuel in the vapor separator chamber 39 is thus controlled by the float operated valve 34. An opening 40 at the top of vapor separator chamber 39 is connected by a line 41 to induction manifold 17. The inlet 30 of high pressure fuel pump 25 is connected by fuel line 42 to draw fuel from the bottom of the vapor separator chamber 39. An excess fuel return line 43 from pressure regulator 26 returns excess fuel to the vapor separator chamber 39 for recirculation.

A puddled fuel return line 44 has an inlet 44a connected to a low point of crankcase 16 and has an outlet 44b connected to vapor separator 33. Other puddle return fuel lines are connected to vapor separator 33 from each crankcase section of the respective remaining cylinders of the engine for recirculation of puddled fuel including heavy fuel ends. During the combustion power stroke of piston 13 away from spark plug 21, the puddled fuel is pumped from crankcase 16 through one-way check valve 45 to vapor separator 33 for recirculation. Valve 45 prevents reverse flow through line 44 back into crankcase 16.

In operation, low pressure fuel pump 31 supplies fuel to vapor separator 33 through float controlled valve 34. The pressure in vapor separator 33 at the surface of the fuel will be held at or below atmospheric pressure by the connection through line 41 to induction manifold 17. Thus, fuel which vaporizes will be drawn from separator 33 and supplied through line 41 to induction manifold 17. Hence, vapor free fuel will be supplied through line 42 to inlet 30 of high pressure fuel injection pump 25. Separator 33 is also effective to remove vapors from the excess fuel returned to separator 33 from pressure regulator 26 through excess fuel return line 43. Separator 33 is also effective to remove vapors from the puddled fuel returned to separator 33 from crankcase 16 through puddled fuel return line 44.

DESCRIPTION OF THE INVENTION

Figure 2:
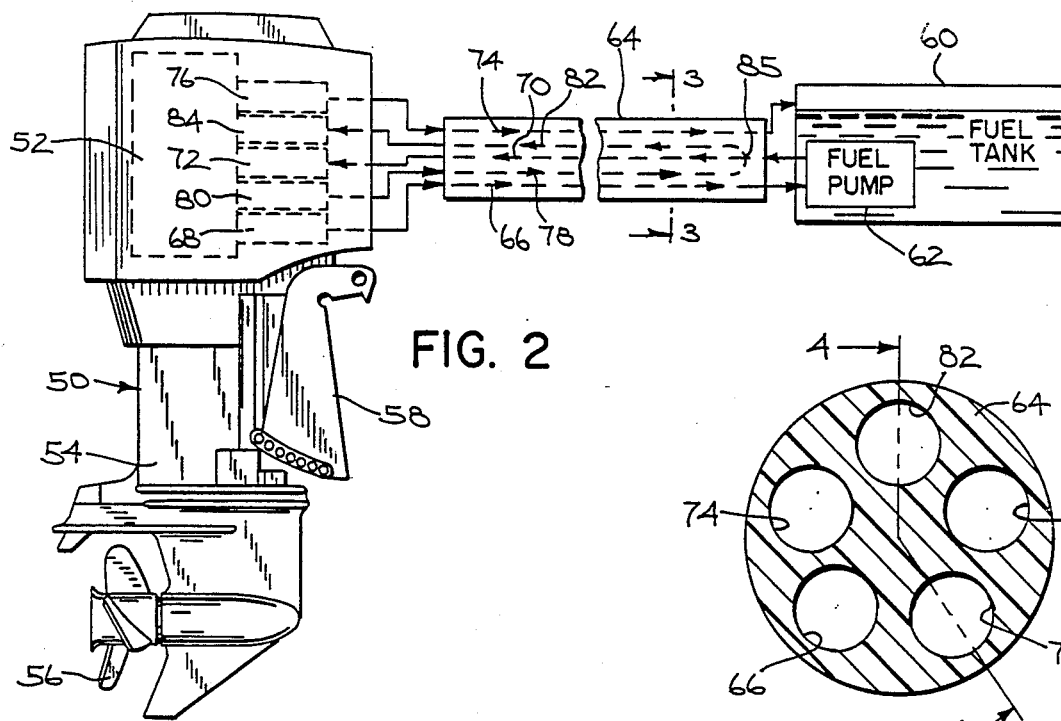
FIG. 2 shows a fuel system in accordance with the invention.

FIG. 2 shows an outbaord marine propulsion unit 50 having a power head with a two cycle crankcase compression water cooled internal combustion engine 52, a lower depending gearcase 54 and propeller 56. Outboard propulsion unit 50 is mounted to the transom of a boat (not shown) by transon bracket 58. A remote fuel tank 60 is within the boat. A fuel pump 62 in remote fuel tank 60 delivers fuel to the engine. Fuel pump 62 is a crankcase pressure driven fuel pump, *Outboard Service Training Notebook*, Brunswick Corp. Bulletin 90-90592 3-1286, pp. 10-111, and U.S. Pat. No. 3,924,975, incorporated herein by reference. Fuel pump 62 is like fuel pump 31, FIG. 1, except that fuel pump 62 is located in fuel tank 60 remotely from the engine.

Figure 3:
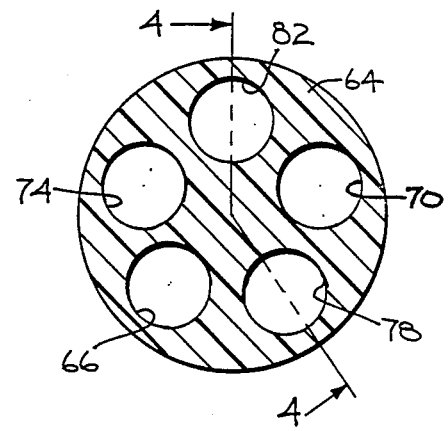
FIG. 3 is a sectional view taken along line 3—3 of FIG. 2.
Figure 4:
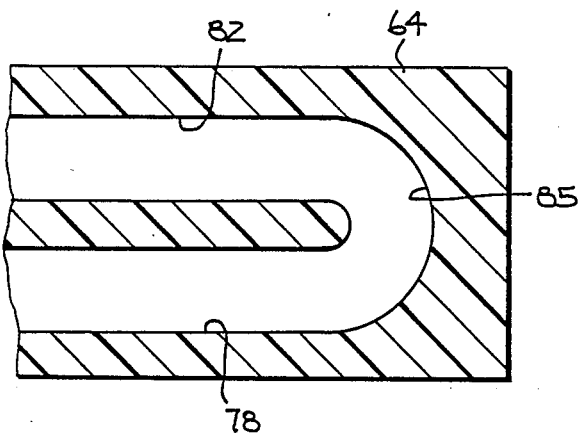
FIG. 4 is a view of a portion of the conduit in FIG. 2.

A conduit 64 is connected between remote fuel 60 and engine 52. Conduit 64 has a first passage 66, FIG. 3, communicating crankcase pulse pressure from the engine at crankcase pressure port 68 to fuel pump 62. Conduit 64 has a second passage 70 supplying fuel from fuel pump 62 to the engine at fuel inlet 72 which is the inlet to vapor separator 33, FIG. 1, at line 32. Conduit 64 has a third passage 74 returning fuel vapor to fuel tank 60 from the outlet 76 of the vapor separator, which is outlet 40 in FIG. 1. Vapor return line 41 in FIG. 1 may also be used, or may be deleted. Conduit 64 has a fourth passage 78 supplying cooling water towards tank 60 from the engine at the coolant feed junction 80 at the output of the water pump and the input of the engine cooling system, *Outboard Service Training Notebook*, Brunswick Corp. Bulletin 90-90592 3-1286, p. 105, and U.S. Pat. Nos. 4,480,605 and 4,312,304, incorporated herein by reference. Conduit 64 has a fifth passage 82 returning water from fourth passage 78 back to the engine at coolant discharge junction 84 downstream of the thermostat between the thermostat and the exhaust elbow, *Outboard Service Training Notebook*, Brunswick Corp. Bulletin 90-90592 3-1286, and U.S. Pat. No. 4,573,318, incorporated herein by reference. Conduit 64 is a plastic molded member, and the coolant water passages 78 and 82 are in heat transfer relation with fuel passage 70, and the other passages, through the plastic conduit material. Passages 78 and 82 communicate through a U-shaped bend 85 proximate the fuel tank, FIG. 4.

Figure 5:
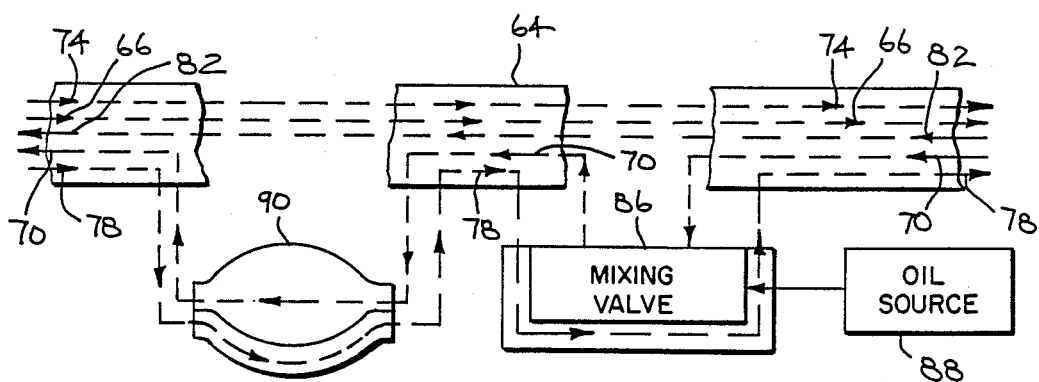
FIG. 5 shows a further embodiment.

In a further embodiment, FIG. 5, an automatic oil-fuel mixer valve 86, for example as shown in U.S. Pat. No. 4,583,500, incorporated herein by reference, is connected in fuel passage 70 for mixing oil from oil source 88 with the fuel flowing to the engine, and coolant passage 78 and/or 82 is provided around the mixing valve to cool the latter. In a further embodiment, a squeeze bulb 90 is connected in fuel passage 70 for priming the engine, and coolant passage 78 and/or 82 is provided around the squeeze bulb to cool the latter.

It is recognized that various equivalents, alternatives and modifications are possible within the scope of the appended claims.

We claim:

1. A marine propulsion system comprising a two cycle crankcase compression water cooled internal combustion engine with a vapor separator, a remote fuel tank, a fuel pump at said tank for delivering fuel to said engine in response to crankcase pulse pressure, a conduit connected between said fuel tank and said engine, said conduit having a first passage communicating crankcase pulse pressure from said engine to said fuel pump at said remote fuel tank, said conduit having a second passage supplying fuel from said fuel pump to said engine, said conduit having a third passage returning fuel vapor from said vapor separator at said engine back to said remote fuel tank, said conduit having a fourth passage supplying cooling water from said engine towards said remote fuel tank, said conduit having a fifth passage returning water from said fourth passage back to said engine.

2. The invention according to claim 1 wherein said fourth and fifth passages are in heat transfer relation with said second passage.

3. The invention according to claim 2 wherein said fourth passage communicates with said fifth passage through a U-shaped bend proximate said remote fuel tank.

4. The invention according to claim 2 comprising an oil-fuel mixing valve connected in said second passage for mixing oil from an oil source with fuel flowing to said engine, and wherein said mixing valve is cooled with water from one of said fourth and fifth passages.

5. The invention according to claim 2 comprising a squeeze bulb connected in said second passage for priming said engine, and wherein said squeeze bulb is cooled with water from one of said fourth and fifth passages.

* * * * *